Dec. 13, 1938. J. H. COHEN 2,140,311
CIGAR LIGHTER
Original Filed July 23, 1932 2 Sheets-Sheet 1
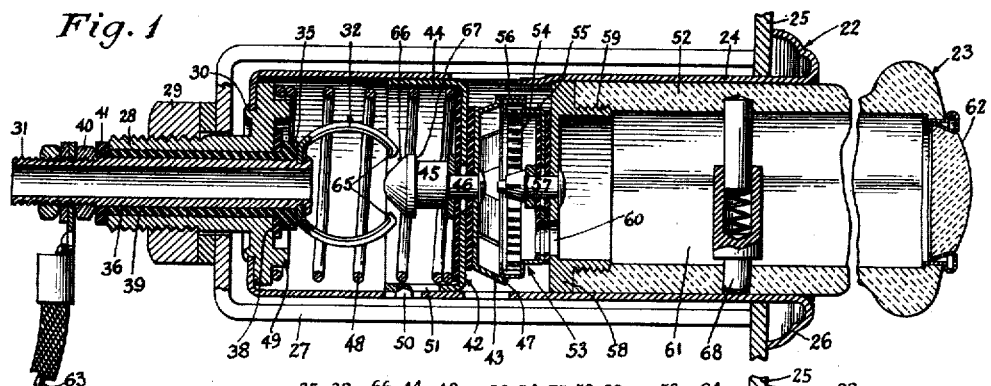
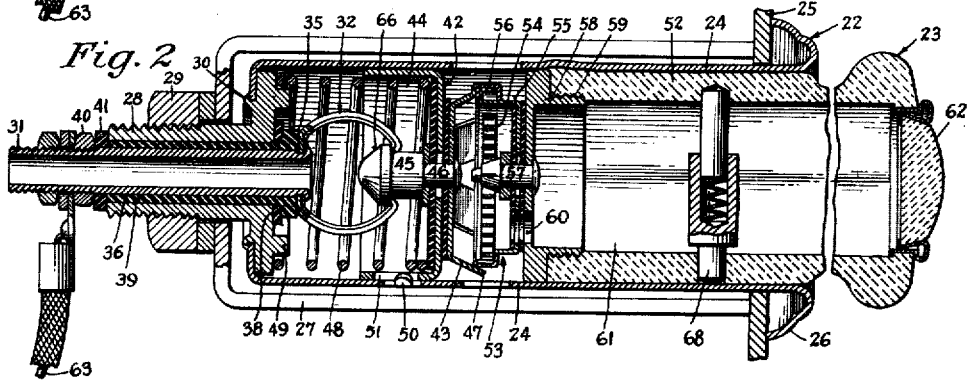
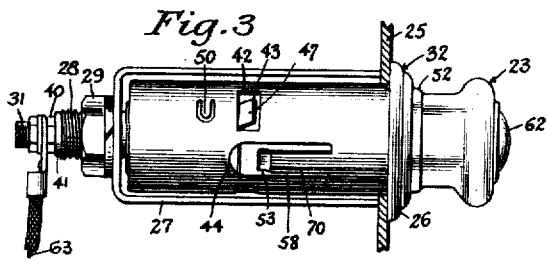
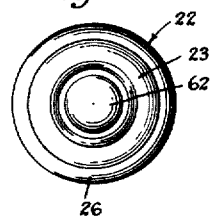
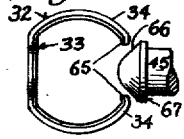
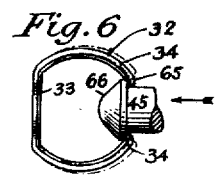
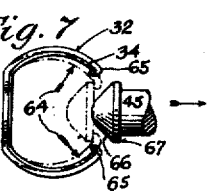
INVENTOR
Joseph H. Cohen,
BY
ATTORNEY Dec. 13, 1938.                J. H. COHEN                 2,140,311
                              CIGAR LIGHTER
                Original Filed July 23, 1932    2 Sheets-Sheet 2
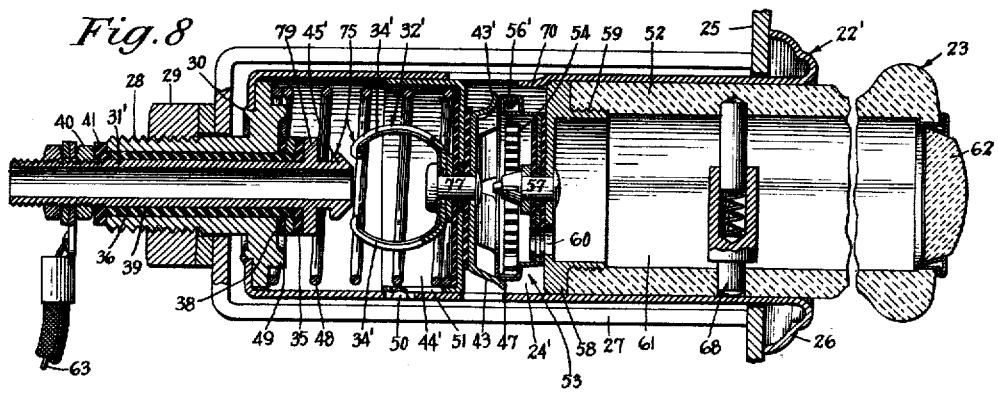
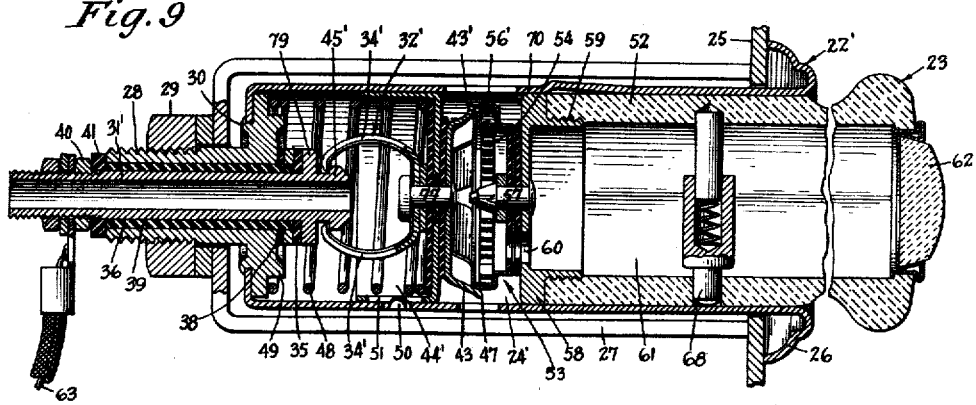
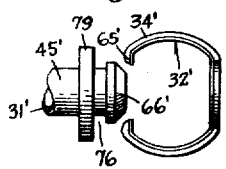 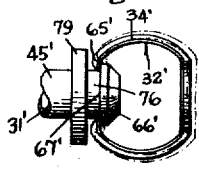 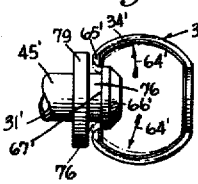 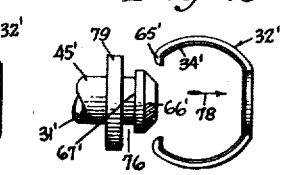
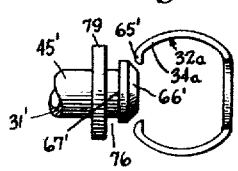 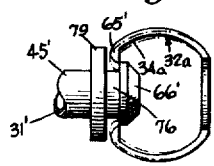 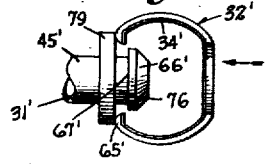
INVENTOR
Joseph H. Cohen,
BY
ATTORNEY Patented Dec. 13, 1938

2,140,311

UNITED STATES PATENT OFFICE 2,140,311

CIGAR LIGHTER

Joseph H. Cohen, Bridgeport, Conn., assignor to Automatic Devices Corporation, Bridgeport, Conn., a corporation of Connecticut Original application July 23, 1932, Serial No. 624,193, now Patent No. 2,117,703, dated May 17, 1938. Divided and this application January 2, 1937, Serial No. 118,838

27 Claims. (Cl. 219—32)

This invention relates to electric cigar lighters, and more particularly to the type in which an igniting unit is completely removable from a holding device for use. Such cigar lighters are particularly desirable for use on motor vehicles.

An object of this invention is to provide an improved cigar lighter of the type referred to in which the current-supply circuit for the heating element of the igniting unit, after being closed as the result of manual engagement of a portion of the igniting unit which is accessible while the latter is supported on the holding device, is automatically maintained closed until the heating element is heated for use.

Heretofore it was proposed to do this by providing parts of the automatic control for the circuit, some on the holding device and some on the igniting unit, with the result that these separable parts had to be made to match each other in each particular cigar lighter for best results, and hence the igniting units and the holding devices, respectively, were not interchangeable with other like igniting units and holding devices.

According to the present invention, this difficulty is obviated by so arranging the means for automatically controlling the circuit supplying current to the heating element and restoring the circuit to normal open-circuit position, that they are carried entirely by solely one and the same of the two separable parts of the cigar lighter. With this new arrangement of such means, they remain in predetermined operative relation relative to each other in a single operative structure irrespective of the interchange of said igniting unit or holding device with other like igniting units or holding devices, which is of great advantage in the manufacturing, installation and servicing of such cigar lighters.

Another feature of this invention is the provision of an improved circuit-controlling means for the cigar lighter comprising relatively movable members manually caused to be moved to close the circuit, detent means for holding the members in closed-circuit position, yielding means to restore them to open-circuit position, and heat-responsive means for controlling the return of the members to open-circuit position.

Preferably, though not always essentially, the heat-responsive means is in heat-receiving relation with the heating element and may advantageously be bimetallic and carry the detent means as well as surfaces contacting with surfaces on one of the relatively movable members to conduct current to the heating element. Also, the heating element, the relatively movable members, the detent means, the heat-responsive means, and the means for urging the members to open-circuit position, either all or some of these, preferably, though not always essentially, may be arranged in the part of the cigar lighter carrying them so as to be coaxial with each other. This construction makes for easy assembly of the parts and close nesting so that they may be contained safely conveniently within the part of the cigar lighter carrying them.

Another feature of this invention is the provision of means whereby the circuit through the heating element may be maintained closed by manual effort, even though the heat-responsive means has acted to open the circuit, so that the heating element may be reheated for a repeated use, without waiting for the heat-responsive element to cool sufficiently to itself close the circuit.

Other features and advantages will hereinafter appear.

In the accompanying drawings:

Figure 1 is a longitudinal sectional view of the cigar lighter of the present invention in normal inoperative position.

Fig. 2 is a view similar to Fig. 1, but with the cigar lighter in closed or operative position.

Fig. 3 is a plan view of the cigar lighter.

Fig. 4 is a front view.

Fig. 5 is a detail view showing the thermostatic catch of the present invention in the inoperative position.

Fig. 6 is a detail, similar to Fig. 5, but shows the catch in the operative position.

Fig. 7 is a view similar to Figs. 5 and 6, but shows the catch in its fully released condition.

Fig. 8 is a longitudinal sectional view, similar to Fig. 1, but with a modified form of catch and circuit closer, in the normal inoperative position.

Fig. 9 is a view similar to Fig. 8, but shows the parts in the operative position.

Fig. 10 is a detail view of the circuit closer and thermostatic catch of this form of the invention in the open inoperative position, similar to Fig. 8.

Fig. 11 is a detail view, similar to Fig. 10, but shows the catch in closed-circuit position.

Fig. 12 is a detail view, similar to Fig. 11, but shows the catch in its partially released position.

Fig. 13 shows the catch and circuit-closing parts returned to the open inoperative position.

Fig. 14 is a view similar to Fig. 13 of the invention showing the catch used to effect an auxiliary closing of the circuit even though the catch is thermostatically maintained in an open position.

Fig. 15 is a view similar to Fig. 10, but shows the catch and circuit closer parts made of regular material, rather than bimetallic material.

Fig. 16 is a detail view, similar to Fig. 15, in the closed-circuit position and about to be released.

This is a division of my application Serial No. 624,193, filed July 23, 1932, now Patent No. 2,117,703, issued May 17, 1938.

For convenience and clarity in the following description, the present invention is shown as applied to what may be termed "sleeve-type" cigar lighters for use with automobiles, similar to the lighter disclosed in my Patent No. 1,944,925, issued January 30, 1934, but it should be understood that it may also be used with other types of cigar lighters. Broadly, the cigar lighter comprises a holding device or base member 22 and a removable igniting unit 23 which may be mechanically and electrically separated from the base member for use.

The base member 22 comprises a socket 24 adapted to be passed through a suitable aperture in an instrument panel 25 of an automobile, or other convenient location, until a flange 26 at the front end thereof engages with the front face of the panel. The socket is rigidly secured in place with a U-shaped yoke 27 fitted over an outer sleeve 28 and a clamping nut 29. The outer sleeve is preferably rigidly secured to the socket 24 by a spun-over flange 30.

A contact-carrying sleeve 31 is insulatedly mounted in the outer sleeve 28, and at its forward end there is secured a main contact 32 having a main body portion 33 shaped similar to a washer and one or more integral hook-shaped fingers 34 extending therefrom. The contact carrier sleeve is secured in place by passing a washer 35 and tube 36 of insulation over the contact sleeve 31, passing an insulating washer 38 over the insulating sleeve 36, and then passing the entire assembly through a bore 39 of the outer sleeve 28, where it is rigidly secured to the latter part with the nut 40 and insulating washer 41. These various parts of insulation just described prevent electrical connection between the contact sleeve 31 and outer sleeve 28 and are preferably made of mica in order to be heat resisting.

The base member is completed with a relatively movable member or slide 42 which carries an intermediate contact 43. This slide comprises a cup or sleeve 44 which has a free fit within the socket 24. Near its center the cup is provided with a contact and catch stud 45 which is insulated from the cup by suitable insulating washers. It is held in place by spinning or otherwise heading-over the end of the shank 46, and when this is done a contact washer with yielding fingers 47 forming the intermediate contact 43 is secured to the cup so that current may be passed from the contact 45 to the fingers. The cup also serves to hold a spring 48 in the socket 24, free from the side walls at one end, while the other end of the spring is located in the socket by a shoulder portion 49 of the outer sleeve 28. Longitudinal movement of the slide 44 is limited in two directions by a lanced finger 50 part of the socket 24 being bent into and engaging the ends of a slot 51 in the cup.

The removable igniting unit 23 comprises a body 52 preferably made of Bakelite or some similar insulating material of a size to slide freely in the socket 24. At one end it supports a heater unit 53 comprising a spirally wound heating coil 54 in a cup 55. One end of the heating coil is connected electrically to the outer wall of the shell by means of a ring 56 which is spun thereover and the other end of the coil is connected to a stud 57 at a slot in the latter. This stud passes through a suitable hole in the shell 55 and is insulated from the latter with suitable insulating washers. It is mechanically and electrically secured to a ring 58 which has a threaded connection 59 with the igniting unit body. The heater unit 53 is provided with a series of holes 60 which allow the incandescent glow of the heating coil to pass through a bore 61 of the body 52 to the front end of the igniting unit 23 where they are magnified and projected by means of a ruby glass 62, or by a disk of Catalin or similar light-conducting material.

The wiring circuit for the cigar lighter comprises a ground connection through the instrument panel 25, flange 26 and the yoke 27 extending one side of the car battery circuit to the socket 24 portion of the base 22 and the other pole of the circuit comprises a wire 63 from the battery connected to the contact sleeve 31 and rigidly secured thereto with a nut.

Now, of particular importance, the cigar lighter is, according to the present invention, arranged to prevent an excessive drain on the battery, and to lessen the amount of attention required from the driver. To this end, there is provided a novel catch for holding the igniting unit in energizing position and a novel circuit closer switching arrangement for automatically controlling the circuit between the movable contact stud 45 and the stationary main contact 32.

This special catch and thermostatically controlled switch is, according to the present invention, made as a unitary structure; that is, both are embodied together and it is thereby possible to effect a marked economy in the cost of manufacture, because fewer parts are required and a single assembly and adjustment takes care of both the catch and the thermostatically controlled switch. In its present preferred form this combined catch and thermostatically controlled switch comprises the main contact 32, made of bimetallic material in order to be responsive to thermal conditions of the latter. The fingers thereon are of narrow width and slightly bowed so that there is a marked tendency for these fingers to spread or to open up in the direction of the arrows 64 in Fig. 7 to the solid line position shown in the latter figure under the influence of heat.

These fingers are provided with hooks 65 at their outer ends which are adapted to engage with a bevel 66 on the front end of the main contact stud 45 and be forced apart thereby and then snapped in back of a shoulder 67 portion of the stud when the sliding sleeve is pushed toward the bottom of the socket into position shown in Fig. 2.

The contact finger hooks 65 thus positively lock the sliding sleeve 44 in the closed position and at the same time complete an electrical connection from the main contact sleeve 31, contact 32, and the stud 45 to the intermediate contact disk 43 and also through the ring 58 and stud 57 of the removable igniting unit 23 to complete the circuit to the heating coil 54 to energize the coil and bring it to incandescence.

As the heating coil 54 is brought to incandescence some of the heat is radiated from the front face of the coil against the inside of the disk 43 and follows through the ring and contact figures 47. As the fingers are heated in this manner some of the heat follows through to the stud 45 and fixed contact fingers 34, and at the same time heats the air within the chamber formed by the socket 24 and shell 44, to cause the contact fingers to expand gradually in the direction of the arrows 64 (see Fig. 7) until the hooks 65 move clear or free of the shoulder 67 whereupon the spring 48 is free to again move the sliding sleeve 44 forwardly in the socket 24 until the movement is stopped by the lanced ear 50 engaging an end of the slot 51 as shown in Fig. 1. At the same time it pushes the removable igniting unit 23 forwardly in the socket and moves the contact 45 of the switch into open circuit or deenergizing position shown in Figs. 1, 5 and 7.

As will be seen from Figs. 1 and 2 of the drawings, all of the elements of the switching means are carried entirely by one and the same part of the cigar lighter, herein illustrated as the holding device or base member, in coaxial alignment with one another and with the heating element. This enables the switch unit to be readily assembled within one of the parts of the cigar lighter.

It should also be noted that the particular form of switching unit and contacts provided therefor by the present invention have the very desirable advantage of making it unnecessary for the operator to twist, push, or in any special manner rotatably align the removable igniting unit 23 relative to the base 22 when returning the unit to the inoperative position on the base, or to do any involved twisting or aligning when it is desired to move the removable igniting unit into the operative or energizing position. It is merely necessary to put the plug 23 into the socket 24 when placing one within the other and merely necessary to push against the end of the igniting unit in order to move it to energizing position.

Normally the igniting unit 23 is in the position shown in Fig. 1 for the driver or other occupant of the car, after using the unit, merely slides it into the socket 24 until the cup 55 and ring 56 thereon engages with the spring contact fingers 47 of the slide 42. The pressure of the spring 48 on the sliding member serves as a stop or indication that the unit has been slid fully into the inoperative position. A spring plunger 68 is located in the plug body 52 to impinge against the bore of the socket 24 and prevent the igniting unit 23 from working out of the socket even though the car vibrates badly.

When it is desired to use the cigar lighter the driver merely grasps the knob which is an accessible portion of the igniter unit body 52 and pushes it and the movable contact-carrying member deeper into the socket against the pressure of the yielding spring 48 whereby the bevelled end 66 of the contact 45, as the contact-carrying member slides in the socket 24, engages with the hooks 65 to spread the fingers 34 until the hooks snap over the shoulder 67 as shown in Fig. 6, to lock the sliding unit in the back and switch closing position. Preferably a long finger 70 is lanced inwardly of the socket 24 with a raised portion adapted to engage and complete electrical connection between the socket 24 and igniting unit if the bore of the socket becomes worn considerably. The operator may then release his grip on the igniting unit and again use both hands for driving while the coil 54 is being heated to incandescence.

As the coil comes up to heat, some of the heat travels through the stud 45 and gradually moves the fingers of the bimetallic contact member to open position while the hooks thereon ride over the shoulder portion 67 of the stud 45 until a release between the shoulder and hooks is effected and the igniting unit moved back into the inoperative position shown in Fig. 1 under the influence of the sliding sleeve 44 and spring 48. Thereafter, the driver pulls the lighter from the socket for use.

The light disk 62 as the outer end of the igniting unit 23 serves to transmit an incandescent glow from the heater coil and warn the operator that the lighter is in condition for use.

In Figs. 8 to 13 inclusive, there is shown a modified form of the present invention. The removable igniting unit 23 in this form of lighter is exactly the same as that shown in the first form of the invention. The holding device or base member 22', however, while like the base member 22 of the preferred form of the invention in many respects is provided with a different form of catch and switch unit 75 comprising a contact stud 45' made integral with a contact sleeve 31' and a sliding sleeve 44' is arranged to support and carry a yielding bimetallic contact member 32' with bowed fingers 34' and hooks 65'.

The fingers 34' and hooks 65' are normally in the closed position shown in Fig. 8, and are adapted to ride over a bevel 66' on the end of the contact sleeve 31' and hook into a groove 76 in back of the shoulder 67', as shown in Figs. 9 and 11. With this form of the present invention, as with the preferred form, it is merely necessary for the operator to push the igniting unit 23 longitudinally into the bore of a socket 24' portion of the base 22' until the hooks snap into the groove 76 whereupon current is conducted to the outer end of the heater coil 54 through the stud 77, contact fingers 43', and ring 56', the circuit being completed by the closed line between the panel 25, shell 24', ring 58, and stud 57 to the inner end of the coil.

When the switch 75 is closed and as the heater coil is brought to incandescence the spring contact fingers 34' and hooks 65' gradually open from the position shown in Fig. 11 in the direction of the arrow 64' and into the position shown in Fig. 12 until the hooks are free of the shoulder 67' portion of the groove 76, whereupon the sliding unit and hook carried thereby, under the influence of the spring 48, travel in the direction of the arrow 78 shown in Fig. 13 to move the igniting unit again into the inoperative position shown in Fig. 8.

This modified form of the present invention has the advantage of making it possible for the operator to manually manipulate the lighter to obtain a further degree of incandescence without waiting for the main contacts 32' to cool and resume their normal closed position, and to this end there is provided an auxiliary contact or flange 79 which contacts with the ends of the hook 65' when the igniter is pushed the full extent toward the back of the base member as shown in Fig. 14.

In Figs. 15 and 16 there is shown a further modified form of the present invention comprising a yielding contact member 32a, having fingers 34a similar to and arranged to ride over the bevel 66' and snap into grooves 76 in much the same manner as the contact member 32', shown in Figs. 10 and 11, or the contact members 32 shown in Figs. 5 and 6. The parts are proportioned to expand the arms as the heater coil is brought to the desired degree of incandescence. This form of yielding contact member may be used in order to effect greater manufacturing economy and it may be more advantageous than the bimetallic form in lighters which are brought to incandescence only slowly, or if the cigar lighter construction is such that there is a quick flow of heat from the heater coil to the yielding contact member; in other words, where it is desired to have a slowly responsive device.

Other variations and modifications may be made within the scope of this invention and portions of the improvements may be used without others.

Having thus described the invention, what is claimed as new and for which it is desired to obtain Letters Patent, is:—

1. In an electric cigar lighter, the combination of a base member; a unit removably supported by the base member; a heating coil on said unit; a circuit for said coil; a slide in said base member, and with the aforesaid unit, movable into operative and inoperative positions thereon; a shouldered stud and a hooked arm on said base and slide members respectively adapted to hold the slide and movable unit in the operative position and to close the circuit to the heating coil, said arm being adapted to move into an open and circuit-breaking position relative to the shouldered stud in response to the increase in temperature of the heating coil; and means for conducting current from the hooked arm to the heating coil when it is in the thermally opened condition and the movable unit is manually moved to operative position.

2. In an electric cigar lighter, the combination of a base member; a unit removably supported by the base member; a heating coil on said unit; a circuit for said coil; a slide in said base member, and with the aforesaid unit, movable into operative and inoperative positions thereon; a detent adapted to hold said slide in the operative position and to close the circuit to the heating coil, until the coil has been heated a predetermined extent whereupon it opens and allows return of the slide to inoperative position and opens the circuit; and means for effecting an auxiliary closing of the circuit through said detent while it is in its thermally open condition and the movable unit is manually maintained in operative position.

3. In an electric cigar lighter, the combination of a base member; a socket on the base member; a plug removably mounted in the socket and longitudinally movable in said socket to a shallow inoperative position and into a deep operative position; a heating coil on said removable plug; means adapted to move the removable plug in the socket from the deep operative position to the shallow inoperative position preparatory to removal and use; and thermal responsive means in axial alignment with the plug for restraining said last-named means until the heating coil reaches a predetermined temperature.

4. In an electric cigar lighter, the combination of a base member; a unit removably supported by the base member, and movable thereon into an operative and into an inoperative position; a heating coil on said unit; a circuit for said coil; a cooperating shouldered stud and hooked arm responsive to the temperature of the heating coil in said circuit, said arm being adapted to move into an open and circuit-breaking position relative to the shouldered stud in response to the increase in temperature of the heating coil; and means for conducting current from the hooked arm to the heating coil when said arm is in the thermally opened condition and the movable unit is manually maintained in operative position.

5. In a cigar lighter of the removable type, a holder; an igniting unit movably mounted on the holder and including a heating element; means responsive to solely bodily movement of the igniting unit and heating element toward the holder to close a current supply circuit including the heating element to heat the latter for use; means, including means responsive to the temperature of the heating element, for moving the igniting unit outwardly of the holder and partially ejecting the same when the heating element attains a predetermined temperature to open the current supply circuit leading to the heating element; and means for maintaining the igniting unit on the holder in partially ejected position against casual removal, the means last-mentioned including a spring-pressed plunger carried by and extending across the igniting unit.

6. In a cigar lighter of the removable type, a holder; an igniting unit movably mounted on the holder and including a heating element; means responsive to solely bodily movement of the igniting unit and heating element toward the holder to close a current supply circuit including the heating element to heat the latter for use; a spring actuated ejector placed under tension when the igniting unit is moved to circuit-closing position for moving the igniting unit outwardly of the holder; and means responsive to the temperature of the heating element and in axial alignment with the same for restraining said ejector and releasing the same when the heating element attains a predetermined temperature to open the current supply circuit leading to the heating element.

7. In a cigar lighter of the removable type, a holder; an igniting unit movably mounted on the holder and including a heating element; means responsive to solely bodily movement of the igniting unit and heating element toward the holder to close a current supply circuit including the heating element to heat the latter for use; and means, including means responsive to the temperature of the heating element and a spring actuated ejector, for moving the igniting unit outwardly of the holder when the heating element attains a predetermined temperature to open the current supply circuit leading to the heating element, said ejector being placed under tension when the igniting unit is moved to circuit-closing position, and having a locking member engaged by the temperature responsive means to be restrained by the latter until the heating element attains said predetermined temperature, said locking member and emperature responsive means being metallic and constituting part of the current supply circuit to the heating element and electrically disengaging each other at said predetermined temperature to open the circuit to the heating element.

8. In a cigar lighter of the removable type, a holder; an igniting unit movably mounted on the holder and including a heating element; means responsive to solely bodily movement of the igniting unit and heating element toward the holder to close a current supply circuit including the heating element to heat the latter for use; and means, including means responsive to the temperature of the heating element and a spring actuated ejector, for moving the igniting unit outwardly of the holder when the heating element attains a predetermined temperature to open the current supply circuit leading to the heating element, said ejector being placed under tension when the igniting unit is moved to circuit-closing position and having a locking member engaged by the temperature responsive means to be restrained by the latter until the heating element attains said predetermined temperature, said locking member and temperature responsive means being metallic and constituting part of the current supply circuit to the heating element and electrically disengaging each other at said predetermined temperature to open the circuit to the heating element, said locking member and temperature responsive means being shaped to be again electrically engaged without mechanically interlocking while the temperature responsive means is still in releasing position.

9. In a cigar lighter of the removable type, a holder; an igniting unit movably mounted on the holder and including a heating element; means responsive to solely bodily movement of the igniting unit and heating element toward the holder to close a current supply circuit, including the heating element to heat the latter for use; means, including means responsive to the temperature of the heating element, for moving the igniting unit outwardly of the holder when the heating element attains a predetermined temperature to open the current supply circuit leading to the heating element, said temperature responsive means being metallic and constituting a part of the current supply circuit and being movable to open the circuit when the heating element attains said predetermined heat; and means for electrically engaging said temperature responsive means when in circuit-opening position to again close the circuit whereby the temperature of the heating element may be raised above said predetermined temperature.

10. In a cigar lighter of the removable type, a holder; an igniting unit movably mounted on the holder and including a heating element; means responsive to solely bodily movement of the igniting unit and heating element toward the holder to close a current supply circuit, including the heating element to heat the latter for use; means, including means responsive to the temperature of the heating element, for moving the igniting unit outwardly of the holder when the heating element attains a predetermined temperature to open the current supply circuit leading to the heating element, said temperature responsive means being metallic and constituting a part of the current supply circuit and being movable to open the circuit when the heating element attains said predetermined heat; and means operative by movement of the igniting unit relative to the holder when the temperature responsive means is in circuit-opening position, to again close said circuit whereby the temperature of the heating element may be raised above said predetermined temperature.

11. In a cigar lighter, a holder; an igniting unit mounted on the holder and removable therefrom for use; a contact-carrying element mounted in the holder for sliding movement between limits; a contact on the holder; a contact on the contact-carrying element adapted to be moved into engagement with the contact on the holder by manual engagement of a portion of the igniting unit which is accessible while the igniting unit is supported on the holder to close an electrical circuit; detent means engaging said contact-carrying element for holding the contacts in engagement; heat-responsive means for releasing the detent means to open the circuit; and means for normally urging the contact carried by the contact-carrying element into open-circuit position.

12. A replaceable heating element for the rear end of an igniting unit comprising a coil of resistance wire; a cup-shaped contact member around said coil into which the outer end of the coil is secured; another cup-shaped member axially but oppositely secured to the first with a layer of insulating material between their adjacent bases; means for clamping the cup-shaped members together, the inner end of said resistance wire being secured to said clamping means; screw threads fixedly secured on the outer surface of said second-mentioned cup-shaped member for cooperation with threads on the inside of the rear end of an igniting unit; and a peripheral electrical contact flange integral with the second-mentioned cup-shaped member substantially aligned with the base portion thereof and extending radially outwardly beyond the sides of both cup-shaped members.

13. An igniting unit for a cigar lighter comprising a hollow body portion of insulating material; a heating element on the rear end of said body and including a coil of resistance wire; a cup-shaped contact member around said coil and to which the outer end of the coil is secured; another cup-shaped member axially but oppositely secured to the first with a layer of insulating material between their bases; means clamping said cup-shaped members together, the inner end of said resistance wire being secured to said clamping means, the outer surface of the walls of said second-mentioned cup-shaped member being provided with screw threads which are fixedly secured thereto engaging cooperating screw threads on the inside of the rear end of said insulating body; and a peripheral electrical contact flange integral with the second-mentioned cup-shaped member substantially aligned with the base portion thereof extending radially outward beyond the sides of both cup-shaped members and contiguous with the rear end of the body, a friction device in front of the peripheral flange biased to a position radially outside of the body for cooperation with the inner surface of a holding device.

14. A cigar lighter having two parts one constituting a holding device and the other constituting an igniting unit removable from the holding device for use and having a heating element thereon, a pair of relatively movable members; means for normally urging the members apart; means carried by each of said members and cooperating to close a circuit through the heating element when moved into engagement with one another when said members are moved toward one another by manual engagement of a portion of the igniting unit which is accessible while the igniting unit is supported on the holding device; and heat-responsive means for holding the movable members in closed-circuit position until the heating element has attained its desired usable heat, said members, the circuit-closing means carried thereby, the urging means, and the heat-responsive means being entirely carried by solely one and the same of the said two parts of the cigar lighter, so as to remain in predetermined operative relation relative to each other in a single operative assembly irrespective of the interchange of said igniting unit or holding device with other like igniting units or holding devices.

15. A cigar lighter having two parts one constituting a holding device and the other constituting an igniting unit removably supported by the holding device and having a heating element thereon, one of said parts having a pair of relatively movable members; means for normally urging the members apart; cooperating circuit-closing means mutually carried by the members; manually operable means for moving said members toward one another into position to close a circuit through the heating element, said circuit-closing means including heat-responsive means in heat-receiving relation with the heating element for opening the circuit when the heating element has attained its desired usable heat; and auxiliary contact means to close said circuit when the heat-responsive means is in open-circuit position and said parts are held together manually.

16. A cigar lighter having two parts one constituting a holding device and the other constituting an igniting unit longitudinally slidable in the holder and removable therefrom for use, said igniting unit having a heating element thereon, a pair of longitudinally movable elements for closing a circuit through the heating element; means for normally urging the elements into an open-circuit position; means for longitudinally moving one of the elements with respect to the other against said urging means and into closed-circuit position by manual engagement of a portion of the igniting unit which is accessible while the igniting unit is supported on the holding device; and heat-responsive latch means for maintaining the elements in closed-circuit position against the action of the urging means until the heating element has attained its desired heat, said movable elements, urging means, and heat-responsive latch being entirely carried by solely one and the same of the said two parts of the cigar lighter, so as to remain in predetermined operative relation relative to each other in a single operative assembly irrespective of the interchange of said igniting unit or holding device with other like igniting units or holding devices.

17. A cigar lighter having two parts one constituting a holding device and the other constituting an igniting unit removably supported by the holding device and having a heating element thereon, one of said parts having a shouldered stud contact and a hook contact thereon relatively movable with respect to the shouldered stud and into engagement therewith to close an energizing circuit through the heating element; and manually operable means for moving the contacts into closed-circuit position, the hook contact being heat-responsive and in heat-receiving relation with the heating element and adapted to hold the circuit closed until the heating element has attained its desired heat.

18. A cigar lighter having two parts one constituting a holding device and the other constituting an igniting unit removably supported by the holding device and having a heating element thereon, one of said parts having a pair of relatively movable members, one of said members carrying a shouldered stud contact and the other a cooperable heat-responsive latch contact in longitudinal alignment with the shouldered stud contact; and means for moving by manual engagement of a portion of the igniting unit which is accessible while the igniting unit is supported on the holding device one of said members longitudinally of the part for causing the contacts to become engaged and close a circuit through the heating element, the heat-responsive latch being disposed behind the shoulders of the stud for holding the movable members in circuit-closing position until the heating element has attained the desired usable heat.

19. A cigar lighter having two parts one constituting a holding device and the other constituting an igniting unit removably supported by the holding device and having a heating element thereon, one of said parts having a pair of relatively movable members, one of said members carrying a shouldered stud contact and the other a cooperable heat-responsive latch contact; means operated by manual engagement of a portion of the igniting unit which is accessible while the igniting unit is supported on the holding device for moving one of said members longitudinally of the part for causing the contacts to become engaged and close a circuit through the heating element, the heat-responsive latch engaging the shoulders of the stud and holding the members in circuit-closing position until the heating element attains the desired heat and then releases the stud contact and opens the circuit; and auxiliary means to again close the circuit through the heating element upon said members being manually held in closed-circuit position while the heat-responsive latch is in thermally open-circuit position.

20. A cigar lighter having two parts one constituting a holding device and the other constituting an igniting unit removably supported by the holding device and having a heating element thereon, one of said parts having a pair of coaxially disposed relatively movable members; means carried by each of the members and cooperating to close a circuit through the heating element when moved relative to one another to a closed-circuit position; means normally urging the members into open-circuit position; and heat-responsive means in heat-receiving relation with said heating element, coaxial with the heating element and coaxial with the movable members, said heat-responsive means holding the movable members in circuit-closing position until the heating element has attained its desired usable heat.

21. A cigar lighter having two parts one constituting a holding device and the other constituting an igniting unit removably supported by the holding device and having a heating element thereon, one of said parts having a pair of relatively movable members, one of said members carrying a stud contact and the other a cooperable contact for claspingly engaging the stud contact and closing a circuit through the heating element when the contacts are moved into engagement with one another, the last-named contact being bimetallic and in heat-receiving relation with the heating element and moving to release the stud contact and open the circuit upon the heating element attaining the desired usable heat.

22. A cigar lighter having two parts one constituting a holding device and the other constituting an igniting unit removably supported by the holding device and having a heating element thereon, one of said parts having a pair of relatively movable members; means for normally urging the members apart; means including a shouldered contact on one of the members and a cooperating contact comprising yieldable jaws to grip the shouldered contact and engage the shoulder thereof on the other member cooperable to close a circuit through the heating element when moved into engagement with one another when said members are moved toward one another by manual engagement of a portion of the igniting unit which is accessible while the igniting unit is supported on the holding device, said jaws being heat-responsive and disengaging and releasing said shouldered contact upon being heating to a predetermined heat.

23. A cigar lighter having two parts, one constituting a holding device and the other an igniting unit supported by the holding device but removable therefrom for use, said igniting unit having a heating element thereon and being adapted for use with said holding device or another like holding device, a switch including a pair of contacts, one being relatively movable with respect to the other to close a circuit through the heating element; means for normally urging the contacts into open-circuit position; means for moving the contacts into closed-circuit position by manual engagement of a portion of the igniting unit which is accessible while the igniting unit is supported on the holding device; detent means for maintaining the circuit closed against the action of the urging means; and heat-responsive means for releasing the contacts to the action of the urging means upon the heating element attaining its desired heat, said switch, detent means, urging means, and heat-responsive means being entirely carried by solely one and the same of said parts of the cigar lighter, so as to remain in predetermined operative relation relative to each other in a single operative assembly irrespective of the interchange of said igniting unit or holding device with other like igniting units or holding devices.

24. A cigar lighter having two completely separable parts, one being a holder and the other an igniting unit supported by the holder but removable therefrom for use and carrying a heating element; means for feeding energizing current to the heating element including cooperating contacts on the holder and igniting unit; a switch having relatively movable contacts, manually operated means for closing said switch; and thermostatically controlled means associated with said switch and in heat-receiving relation with the heating element for causing the switch to be opened when the heating element is ready for use and to remain open until the next operation of said manually operated means, said switch and thermostatically controlled means being entirely carried by solely one and the same of the said two parts of the cigar lighter, so as to remain in predetermined operative relation relative to each other in a single operative assembly irrespective of the interchange of said igniting unit or holding device with other like igniting units or holding devices.

25. A cigar lighter having two parts, one of said parts being a holding device and the other of said parts being an igniting unit supported by the holding device but removable therefrom for use, said igniting unit having a heating element thereon; cooperating contacts on the holding device and the igniting unit to normally establish circuit connections between the said two parts; and a switch for closing an energizing circuit including said contacts and heating element, said switch being movable to closed-circuit position by manual engagement of a portion of the igniting unit which is accessible while the igniting unit is supported on the holding device, thermostatically controlled and automatically restored to open-circuit position when the heating element has been heated for use, said switch being entirely carried by solely one and the same of the said two parts of the cigar lighter, so that all component parts of the switch remain in predetermined operative relation to each other in a single operative assembly irrespective of the interchange of said igniting unit or holding device with other like igniting units or holding devices.

26. A cigar lighter having two parts one constituting a holding device and the other constituting an igniting unit removably mounted on the holding device for use and having a heating element thereon, one of said parts having a pair of coaxially disposed relatively movable members; means carried by each of the members and cooperating to close a circuit through the heating element when moved relative to one another to a closed-circuit position by manual engagement of a portion of the igniting unit which is accessible while the igniting unit is supported on the holding device; means normally urging the members into open-circuit position; means for holding the movable members against said urging means when moved into closed-circuit position; and heat-responsive means coaxial with the movable members for releasing the holding means upon the heating element attaining a desired usable heat whereby the urging means moves the members into open-circuit position and maintains the circuit open until it is again manually closed.

27. A cigar lighter having two parts, one constituting a holding device and the other an igniting unit supported by the holding device but removable therefrom for use, said igniting unit having a heating element thereon and being adapted for use with, said holding device or another like holding device, a switch including a pair of contacts, one being relatively movable with respect to the other to close a circuit through the heating element; means for normally urging the contacts into open-circuit position; means for moving the contacts into closed-circuit position by manual engagement of a portion of the igniting unit which is accessible while the igniting unit is supported on the holding device; detent means for maintaining the circuit closed against the action of the urging means; and heat-responsive means for releasing the contacts to the action of the urging means upon the heating element attaining its desired heat, said switch, detent means, urging means, and heat-responsive means being carried entirely and solely by the holding device.

JOSEPH H. COHEN.

CERTIFICATE OF CORRECTION.

Patent No. 2,140,311.                               December 13, 1938.

JOSEPH H. COHEN.

It is hereby certified that error appears in the printed specification of the above numbered patent requiring correction as follows: Page 4, second column, line 57, claim 7, for "emperature" read temperature; page 7, first column, line 8, claim 22, for the word "heating" read heated; line 31, claim 23, before "parts" insert two; and that the said Letters Patent should be read with this correction therein that the same may conform to the record of the case in the Patent Office.

Signed and sealed this 7th day of February, A.D. 1939.

Henry Van Arsdale.

(Seal)                                      Acting Commissioner of Patents.

DISCLAIMER 2,140,311.—*Joseph H. Cohen,* Bridgeport, Conn. CIGAR LIGHTER. Patent dated December 13, 1938. Disclaimer filed November 6, 1940, by the assignee, *Automatic Devices Corporation.*

Hereby enters this disclaimer to claims 3, 20, and 26 of the patent.

[*Official Gazette December 3, 1940.*]